United States Patent
Vinck

[19]

[11] Patent Number: 5,953,988
[45] Date of Patent: *Sep. 21, 1999

[54] SCREEN PRINTING PROCESS USING ROTATED SCREENS

[75] Inventor: Paul Vinck, Hove, Belgium

[73] Assignee: AGFA Gevaert, N.V., Mortsel, Belgium

[*] Notice: This patent issued on a continued prosecution application filed under 37 CFR 1.53(d), and is subject to the twenty year patent term provisions of 35 U.S.C. 154(a)(2).

[21] Appl. No.: 08/707,161

[22] Filed: Sep. 3, 1996

Related U.S. Application Data

[60] Provisional application No. 60/007,234, Nov. 3, 1995.

[30] Foreign Application Priority Data

Sep. 12, 1995 [EP] European Pat. Off. .............. 95202467

[51] Int. Cl.[6] ..................................................... B41M 1/12
[52] U.S. Cl. ........................................... 101/129; 101/115
[58] Field of Search .................................... 101/114, 115, 101/123, 127.1, 128.4, 129

[56] References Cited

U.S. PATENT DOCUMENTS

| | | | |
|---|---|---|---|
| 4,939,991 | 7/1990 | Szarka | 101/123 |
| 4,965,599 | 10/1990 | Roddy et al. | 346/160 |
| 5,394,252 | 2/1995 | Holladay et al. | 358/533 |

FOREIGN PATENT DOCUMENTS

| | | | |
|---|---|---|---|
| 1803707 | 6/1970 | Germany | 101/115 |
| 2229722 | 12/1972 | Germany | 101/127 |

OTHER PUBLICATIONS

European Search Report for EP 95202467 Mar. 1996.
Translation of DT 1,803,707; Halftone Screen Set of Printing Plates for Moire–free Duotone and Multi–Color Printing; Apr. 18, 1969; 7 pages.

*Primary Examiner*—Ren Yan
*Attorney, Agent, or Firm*—John A. Merecki; Robert A. Sabourin

[57] ABSTRACT

The screen printing process together with halftoning techniques for reproducing continuous tone color images has given considerable moiré problems. Interferences between the halftoning technique and the screens, and the subsequent screens may be alleviated by appropriate orientation of the screens with respect to each other. Preferentially a frequency modulation halftoning technique is used for halftoning the color components.

9 Claims, 2 Drawing Sheets

SCREEN PRINTING PROCESS USING ROTATED SCREENS

This application claims benefit of provisional application 60/007,234 filed Nov. 3, 1995.

FIELD OF THE INVENTION

The present invention relates to devices and methods for graphic arts colour screen printing applications. More specifically the invention is related to screens particularly suitable for rotary screen printing.

BACKGROUND OF THE INVENTION

The screen printing process or screen process, also called silk screen process or serigraphy is a process of printing through the unblocked areas, called screen cells, of a metal or fibre screen, with a free flowing ink (screen printing ink) which is spread and forced throughout the screen by means of a squeegee. This technique is frequently used in the production of coloured posters, show cards, decalcomania, printed circuits etc. Originally the screen was made almost exclusively of silk. Natural silk meshes, however, are woven from stranded threads and have irregularities and a rough surface structure. Most widely used materials today are nylon, terylene and metal. Serigraphy is literally drawing on silk. By screen printing various kinds of support materials or carriers can be printed, in most cases using ultraviolet light drying screen printing inks. Often claimed benefits are colour stability for fading, and insensitivity for scratches. In general, these are prints fit for use in harsh environmental or manipulation conditions. Rotational or rotary screen production is 5 to 10 times faster than flat screen printing but is handicapped by resolution limits. Common screen printing productivity for quality work is low: flat screen printing has a typical production rate of 4 m/min, rotational screen printing has a rate of 20 to 40 m/min. This may be compared to flexo printing at a typical printing rate of 150 m/min, or a maximum printing rate of 300 m/min.

Screens for use in the screen printing process comprise a plurality of screen cells, through which the screen printing ink may flow. These screen cells may be arranged either orthogonally or hexagonally. According to an orthogonal arrangement of the screen cells, also referred to as a 90° geometry, screen cells have a rectangular or square shape and are arranged side by side adjacent to each other in a regular rectangular or square grid. Screen cells may be formed by two orthogonal sets of parallel wires, typically for silk screens. According to a hexagonal arrangement, screen cells have the shape of an equilateral hexagon and are arranged side by side in three directions: horizontally, at 60° and at 120°. This arrangement is also referred to as a 60° geometry, symmetry or screen and may be realised by a metal screen. The screen pitch, i.e. the shortest distance between the centres of two adjacent screen cells, depends on the technology and the geometry used. A typical pitch value for currently used metal screens is 83 $\mu$m, whereas silk screens may have a 55 $\mu$m period, which corresponds to 180 wires/cm.

In screen printing, colour images may be reproduced by decomposing or separating the original colour image in a number of screen print colour components. These separated colour components are in general printed in juxtaposition (side by side) or in solid overprints, using the same type of screens for each colour component. Each screen will subsequently print part of the colour image with the appropriate print colour. Halftone techniques may be used to create colour shades. It is emphasized that in the rest of the text "screening", "screen" etc. refers to the screen printing process, whereas "halftoning", "halftone" (in other literature also referred to as "screening") refers to the process where varying densities are obtained by varying the spatial distribution of halftone dots, the halftone dots being realised by a binary process: i.e. ink or no ink, an open or closed screen cell in the screen material, softened or hardened clusters on a chemical or photosensitive substrate etc. Colour shades may be varying between the colour of the base or carrier, e.g. paper or textile, and the solid ink colour. With the more traditional halftoning techniques, halftone dots are arranged in a uniform grid of halftone cells and the different shades are obtained by varying the size of the halftone dot per unit area of the halftone cell.

By application of a halftone image to a screen, the halftone dots, making up the halftone image, will be re-sized by the screen structure, depending on the screen pitch versus the size of halftone dot used, and only an integer number of screen cells will be covered. This will reduce (quantization effect) the number of shades that can be reproduced. The halftone pattern will further interfere with the screen pattern due to the periodic structure of both the screen and the halftoning method, in turn the halftoned colour overprints will interfere because the same screen structure is used in printing, both resulting in moiré patterns in the print. Colour stability will suffer from minute register variations between the subsequent colour prints due to varying overlap of the coloured dots. This situation puts practical limits for the halftone-screen printing combinations to guarantee fluent tone transitions and to prevent objectionable moiré patterns or colour inaccuracies in the print. In order to avoid the above mentioned problems, for coarse screens, the use of halftoned overprints will be avoided.

OBJECTS OF THE INVENTION

It is therefore a first object of the invention to provide a method and materials for screen printing, in which interferences of subsequent screens are avoided or diminished.

It is a further object of the invention to provide a method, wherein interferences between screen and halftoning methods are diminished.

It is even a further object of the invention to provide a screen printing process, in which overall moiré patterns are reduced to a minimum.

Further objects and advantages of the invention will become apparent from the description hereinafter.

SUMMARY OF THE INVENTION

The above mentioned objects are realised by the specific features according to the claims. Preferred embodiments of the invention are disclosed in the dependent claims.

The inks used in the printing process are preferentially screen printing inks, each having a process colour. In a trichromatic printing process, process colours are cyan, magenta and yellow. In a quadrichrome printing process, black may be added to the basic set of process colours.

The carrier is the substrate on which an image is printed. This substrate may be textile, such as T-shirts, pull-overs; bottles made of glass or pottery; tiles for floors or walls; plain paper, corrugated board or cardboard. The use of metal type screen allows for rotational screen printing, useful for textile, wallpaper, label and like applications.

A different geometry may be realised by a different size of the screen cells, or by different geometry of the screen cells, e.g. orthogonal versus hexagonal. In a more preferred embodiment, the different geometry is realised by a difference in orientation of the subsequent screens. Very good results are obtained if three orthogonal screens are used, the second screen having an orientation of about 30° with respect to the first screen and a third screen having an orientation of about 60° with respect to the first screen. If hexagonal screens are used, preferentially the second screen has an orientation of about 15° with respect to the first screen and the third screen has an orientation of about 30° with respect to the first screen. Even with tolerances of ±9°, better results are achieved than those obtained by orienting all screens according to a substantially same direction.

For each original image, after separation in colour components, a "dominant colour component" or dominant ink may be defined. This is the colour component that has the largest amount of high density regions. In most images, the cyan component is the most dominant one, followed by the black component. In a preferred embodiment using hexagonal screens, the screen for printing the most dominant component is given an orientation of 60°, the screen for printing a less dominant component is given an orientation of 45°, whereas the next component gets an orientation of 75°. The yellow component in a quadrichrome screen printing process is usually the least dominant component and is given preferentially the same orientation as the magenta component, avoiding interference as much as possible with the black component.

The present invention is characterized by using different screens for the individual screen colours. In a preferred embodiment, halftoning techniques are used in order to obtain colour shades. In a more preferred embodiment, frequency modulated halftoning techniques are used. The frequency modulated halftone technique allows to create shades of colour by varying the number of similar sized halftone dots per unit area, in which the halftone dots are positioned according to a stochastic pattern. The size of the halftone dots is preferably brought in accordance with the screen pitch, such that each halftone dot will cover one or an integer multiple of screen cells. In this respect the loss of shades is avoided. The interference pattern between halftone and screen will be absent because of the stochastic placement of the halftone dots. The interference pattern between the print colours is minimized to the smallest and in general invisible pattern by using different screens. For screens having a regular symmetric pattern and to minimize print register dependency, the screen difference is preferably obtained by rotation of the screens to an angle that will minimize the pattern size to become invisible for the naked eye.

To reduce the visibility of moiré patterns in overprint, relatively coarse halftone rulings compared to the screen will be used. The method according to the current invention is especially well suited for applications using weaved silk or metal types of screens. Due to the missing structural strength, some screens are only possible in flat screen printing, using a rectangular frame to keep the screen under tension. Rotation of the screen structure relative to the rectangular frame, allows various graphic arts screen printing applications.

The use of different screens per print colour or rotated screen orientations and the use of frequency modulated halftones makes it possible to reproduce image details, almost without loss of shades and moiré patterning, improving image quality in screen printing. Depending on the screen geometry, the use of rotated screens accommodates a number of colours in overprint, reducing the number of screen colours otherwise required to faithfully reproduce colour jobs in juxtaposition.

BRIEF DESCRIPTION OF THE DRAWINGS

The invention is described hereinafter by way of examples with reference to the accompanying figures wherein.

DETAILED DESCRIPTION OF THE PREFERRED EMBODIMENTS

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appending claims.

The following abbreviations will be used for colour components: C for Cyan, M for Magenta, Y for Yellow, K for black, G for Green and O for Orange.

Figure 1:
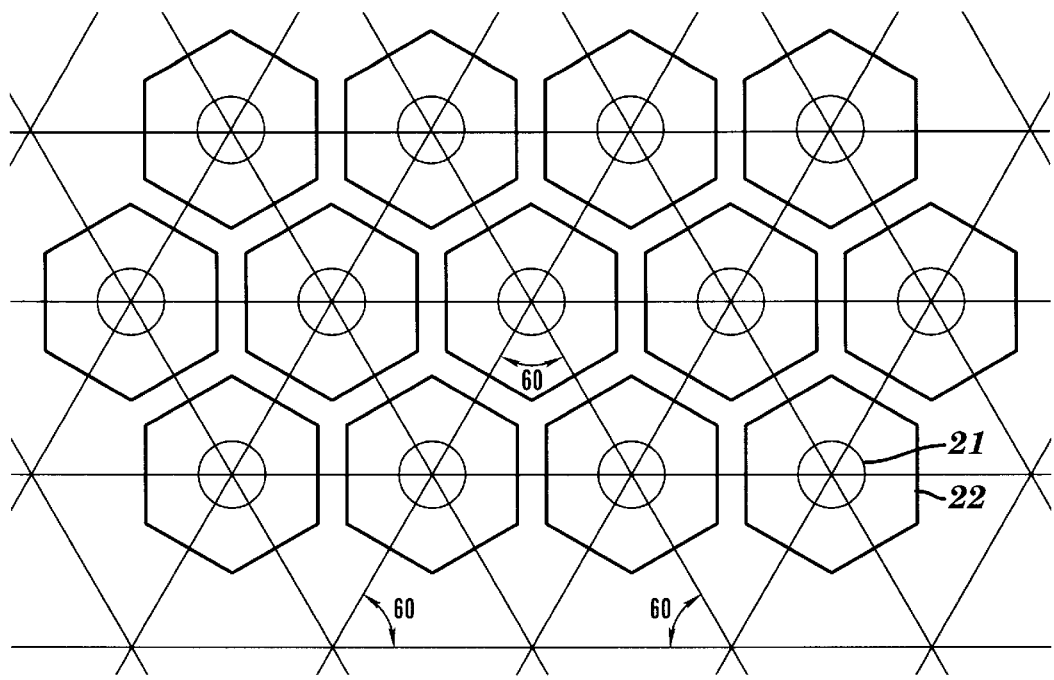
FIG. 1 shows a hexagonal screen, suitable for carrying out the method according to the current invention.

Referring to FIG. 1, a typical screen with a 60° symmetry is shown. It consists of a layer with round holes 21, in general with such dimensions and model chosen and compacted to optimize the ink flow of the screen printing ink through the screen to guarantee solid coverage, while maintaining a sufficient structural strength. FIG. 1 is a view of a hexagonal screen for printing, as observed from the side of the printed matter or carrier. The hexagonal holes 22 are closest to the carrier, the round holes 21 are closest to the ink supply. Ink is supplied to the round holes 21, which are tapered towards the hexagonal holes 22. Ink flows from the round holes on the inking side of the screen towards the hexagonal holes, where the ink is transferred to and spread over the carrier. As indicated on this figure, the holes are arranged along angles of 60°.

Figure 2:
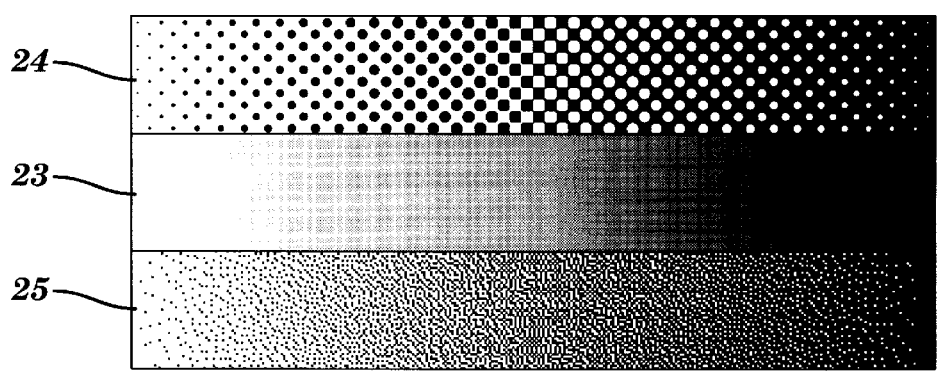
FIG. 2 shows a grey shade realised by autotypical halftoning on the top section, and frequency modulation on the bottom section

FIG. 2 shows a continuous grey wedge 23, the representation of the corresponding grey shades of the wedge by autotypical halftoning 24 and a corresponding frequency modulated or stochastic halftone pattern 25. The figure shows a magnified view of the stochastic placement of equally sized halftone dots, where the amount of the halftone dots per unit area is changed to show the different shades that can be obtained. In general the dot dimensions are such that the individual dots remain invisible at normal reading distance.

Figure 3:
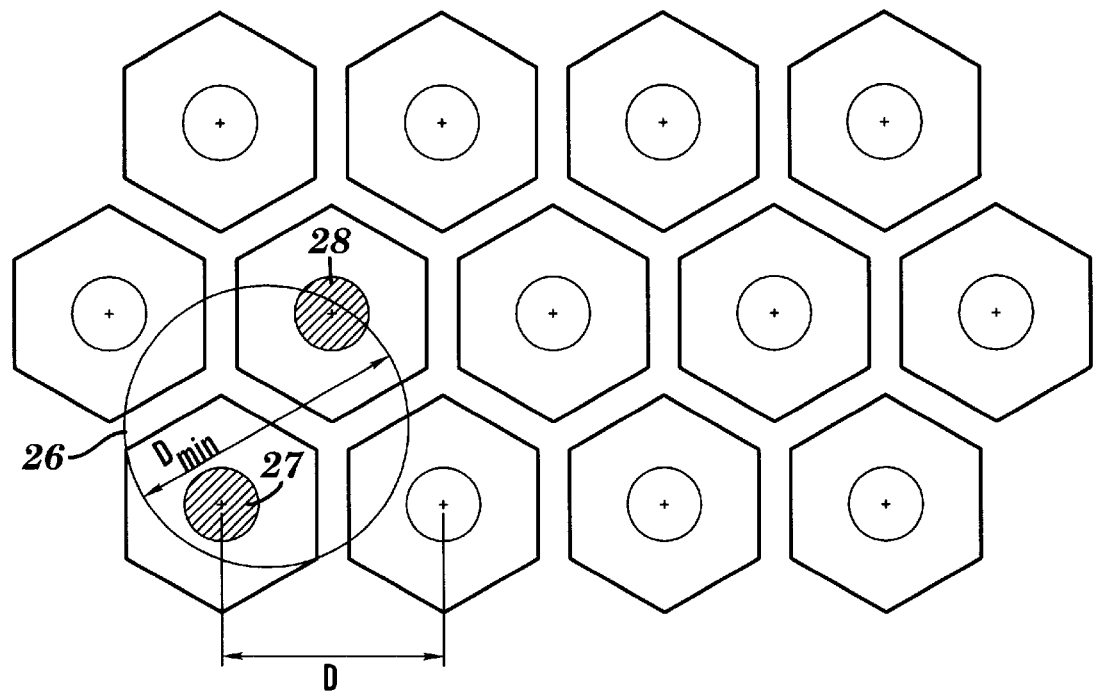
FIG. 3 shows a hexagonal screen covered by a halftone dot.

FIG. 3 shows the result of a hexagonal screen on which a halftone dot 26 has been placed. The screen cell 27 is blocked according to the halftone dot 26. Also the screen cell 28, although only partly overlapped by the halftone dot 26, is blocked and will not transmit any ink. Halftoning can be accomplished indirectly by photographic means or directly by electronic means. The blocking means can be a remainder of an erasure process (e.g by laser) or a deposit of a blocking agent.

Figure 4:
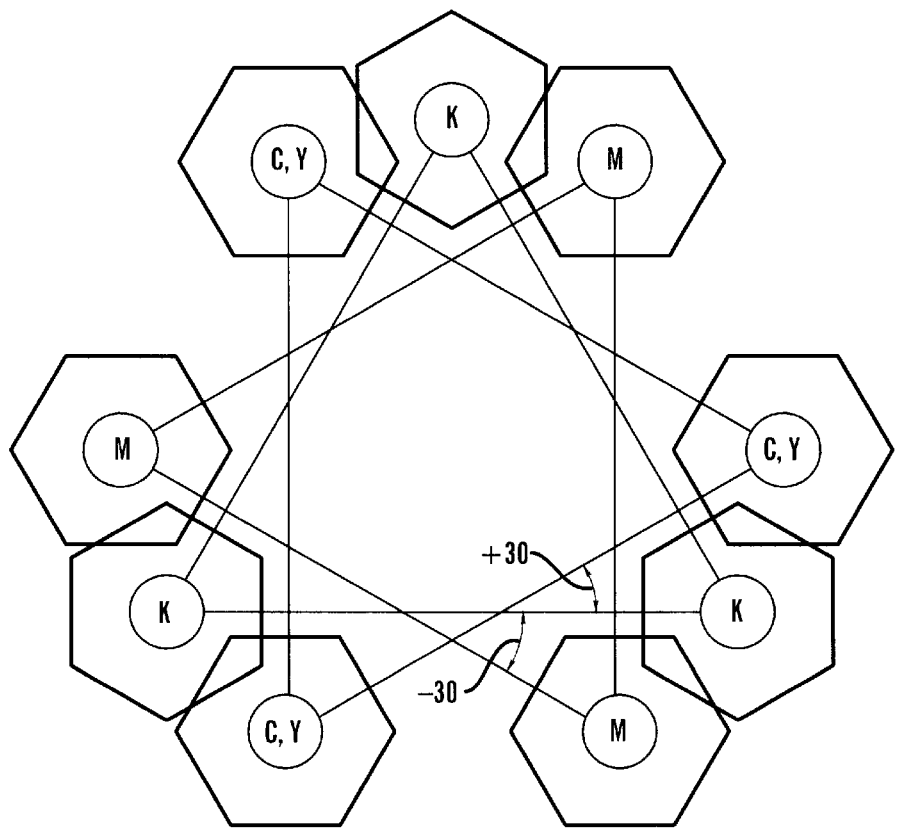
FIG. 4 shows a set of preferred screen orientations for a hexagonal screen.

FIG. 4 shows a preferred orientation of the C, M, K and Y colours for screens with a 60° symmetry. The relation between screen orientation and print colour may be changed as required. In a normal reading position of the reproduction, the most dominant colour from the given set should be associated with the 60° screen, in FIG. 4 taken by the K component. The remaining two from the given set should be associated with the screens angled at plus or minus 15° with reference to the 60° screen, or as shown in FIG. 4, at plus or minus 30° with reference to the 60° screen. For the yellow print, any angle different from the black can be used. Depending on the image contents either a screen with orientation like the C or M angle can be used. The print sequence, or the order in which the subsequent ink layers are applied to the carrier, depends on the ink transparency and ink trapping conditions. The print sequence can be determined by experiment, to obtain the best possible colour gamut.

The method according to the current invention may be used for a trichrome screen printing process, in which three subsequent prints of C,M,Y process colours are applied to the carrier. In a quadrichrome screen printing process, four subsequent prints of C,M,Y,K process colours are done, whereas in a hexachrome process six subsequent overprints of C,M,Y,K,G,O are done with transparent colours. Use of the method according to the current invention will significantly extend the printable colour gamut in screen printing. Compared to former decomposition or separation to individual screen colours, requiring specific separation means, the number of screen colours or print plates or cylinders can be substantially reduced, saving on pre-press and print production time and cost. More colours may be realised by overprinting partially transparent inks, than by mere juxtaposition of specific colours, in which case for each colour one screen is required.

For a Quadrichrome CMYK process using 60° symmetry metal rotative screens, preferentially the following geometry of the screens is used: C at 60°, K at 45°, M at 75° and Y at the same orientation as M, preferentially Y not having the same orientation as K.

Several possible variations of the screen printing process, halftone technology and screen symmetry or geometry are discussed below, without limiting the scope of the invention. A trichrome CMY process, using frequency modulated halftoning with screens with a 60° geometry yields the best results if the screens have a relative orientation of about 15°, 30°, 45° or 60° with respect of each other. Variations of ±9° from these orientations still give substantially better results than other relative orientations. In a trichrome CMY process, conventional halftoning or autotypical halftoning may be combined with screens with a 60° geometry. Even in a more preferred embodiment, a trichrome CMY process may be using mixed conventional and frequency modulated halftoning together with 60° screens. In a trichrome CMY process, using frequency modulated halftoning on screens with a 90° geometry, relative orientations are preferentially +30° and −30° or +60° and −60°. The 90° geometry screens may also be used in a trichrome CMY process, using conventional halftoning. A trichrome CMY process, using mixed conventional and frequency modulated halftoning with a 90° geometry for the screens, enables excellent printing quality.

In a quadrichrome CMYK process, using frequency modulated halftoning with screens with a 60° geometry, 15°, 30° or 60° difference in orientation may be used. In the quadrichrome CMYK process, conventional halftoning may be combined with screens with a 60° geometry. Alternatively, the quadrichrome CMYK process is using a mixed conventional and frequency modulated halftoning with screens with a 60° geometry. A quadrichrome CMYK process, using a frequency modulated halftoning with screens with a 90° geometry is done preferentially by imposing on the screens a relative orientation of substantially 30° or 60°, allowing a variation of 9° plus or minus. The quadrichrome CMYK process may be using conventional halftoning with screens with a 90° geometry and the quadrichrome CMYK process may be using a mixed conventional and frequency modulated halftoning with screens with a 90° geometry.

In a hexachrome CMYKGO process, frequency modulated halftoning may be applied to screens with a 60° geometry. Alternatively, the hexachrome CMYKGO process may be used with mixed conventional and frequency modulated halftoning on screens with a 60° geometry. In another embodiment, the hexachrome CMYKGO process is using a frequency modulated halftoning with screens with a 90° geometry or is using a mixed conventional and frequency modulated halftoning with screens with a 90° geometry.

As described before, the halftone dots may be imaged on the screen by a laser beam, exposing for example a photosensitive material on the screen. Alternative ways of imaging halftone dots on the screen may be realised by halftoning means using direct electronic ink jet (blocking-agent jet) principles for screen blocking (and wash out means). Ink is applied to a screen having open screen cells. A blocking substance, such as ink from an ink jet, is applied image-wise to the screen. Where the blocking substance reaches a screen cell, the screen cell is blocked and will not transmit any screen printing ink. Furthermore, lithographic principles (ink-water principles) may be used to block screens (water jet). Alternatively layered screens may be used, where a uniform (unmodulated) coarse base layer is used to give the screen its structural strength and allows for a uniform ink distribution, and a fine, weaved, sleeve-like top layer carrying the halftoned modulated image information. Imaging with halftoned images may be off-line, e.g. on a separate typesetter or imagesetter; or online, imaging the screen directly on the press, in combination with the above mentioned principles.

Having described in detail preferred embodiments of the current invention, it will now be apparent to those skilled in the art that numerous modifications can be made therein without departing from the scope of the invention as defined in the following claims.

I claim:

1. A method for printing a plurality of inks on a carrier comprising the following steps:

providing a first screen, having first blocked and unblocked screen cells, said first screen cells having a first geometry with respect to the carrier;

applying a first printing ink to said first screen for flowing onto said carrier through said first unblocked screen cells having said first geometry with respect to the carrier;

providing a second screen, having second blocked and unblocked screen cells, said second screen cells having a second geometry being different from said first geometry with respect to the carrier; and applying a second printing ink to said second screen for flowing onto said carrier through said second unblocked screen cells having said second different geometry with respect to the carrier.

2. The method according to claim 1, wherein:

said first screen cells have a first orientation; and, said second screen cells have a second orientation, being different from said first orientation.

3. The method according to claim 2, wherein the difference of relative orientation between said first orientation and said second orientation is between 21° and 39° or between 51° and 69°.

4. The method according to claim 2, wherein the difference of relative orientation between said first orientation and said second orientation is between 6° and 24° or between 21° and 39° or between 36° and 54°.

5. The method according to claim 2, wherein the difference of relative orientation between said first orientation and said second orientation is between 21° and 39° for at least two screens for application of dominant inks.

6. The method according to claim 1, wherein said screen cells of at least one screen are selectively blocked and unblocked according to a frequency modulated halftone image.

7. A set of at least two screens for use in a screen printing process on a carrier, comprising:

a first screen having first blocked and unblocked screen cells, said first unblocked screen cells for flowing through onto said carrier a first printing ink, said first screen cells having a first geometry during printing in relation to the carrier;

a second screen having second blocked and unblocked screen cells, said second unblocked screen cells for flowing through onto said carrier a second printing ink, said second screen cells having a second geometry being different, during printing in relation to the carrier, from said first geometry.

8. The set of screens according to claim 7, wherein:

said first screen cells have a first orientation; and, said second screen cells have a second orientation, being different from said first orientation.

9. The set of screens according to claim 7, wherein said screen cells of at least one screen are selectively blocked and unblocked according to a frequency modulated halftone image.

* * * * *